United States Patent [19]

Grimmer

[11] Patent Number: 5,238,622

[45] Date of Patent: Aug. 24, 1993

[54] RESINOUS FOAM FORMULATION FOR SELF-SKINNING COVER MATERIAL

[75] Inventor: Robert A. Grimmer, Berwick, Me.

[73] Assignee: Davidson Textron Inc., Dover, N.H.

[21] Appl. No.: 796,024

[22] Filed: Nov. 22, 1991

[51] Int. Cl.$^5$ ............................................. B29C 67/22
[52] U.S. Cl. ...................... 264/45.5; 264/54; 264/126; 264/DIG. 60
[58] Field of Search .......... 264/45.5, 51, 54, 126, 264/302, DIG. 60

[56] References Cited

U.S. PATENT DOCUMENTS

| | | | |
|---|---|---|---|
| 2,950,505 | 8/1960 | Frank | 264/302 |
| 3,555,130 | 1/1971 | Feuer et al. | 264/54 |
| 3,962,390 | 6/1976 | Mori et al. | 264/126 |
| 4,130,618 | 12/1978 | Hill | 264/126 |
| 4,596,734 | 6/1986 | Kramer | 264/126 |
| 4,636,547 | 1/1987 | Engelmann et al. | 264/126 |
| 4,769,278 | 9/1988 | Kamimura et al. | 156/228 |
| 4,874,568 | 10/1989 | Chau et al. | 264/126 |
| 4,880,843 | 11/1989 | Stein | 264/126 |
| 4,900,489 | 2/1990 | Nagase et al. | 264/302 |
| 4,925,880 | 5/1990 | Stein | 264/126 |

FOREIGN PATENT DOCUMENTS

| | | | |
|---|---|---|---|
| 1241599 | 2/1961 | Fed. Rep. of Germany | 264/126 |
| 61-278545 | 12/1986 | Japan | 264/126 |

*Primary Examiner*—Allan R. Kuhns
*Attorney, Agent, or Firm*—Reising, Ethington, Barnard, Perry & Milton

[57] ABSTRACT

A method of producing a molded foam article having an integral skin and a backing layer of foam comprising mixing particles of two polyvinyl compounds one of the compounds having a molecular weight less than that of the other compound and a higher solvating plasticizer than that of the other compound and casting the mixture against a heated mold surface and melting the one compound to flood the interstices of the particles of the other compound and float to the surface of the heated mold to form a skin and wherein the other compound includes foaming constituents to simultaneously form a layer of foam material behind the skin.

3 Claims, 2 Drawing Sheets

RESINOUS FOAM FORMULATION FOR SELF-SKINNING COVER MATERIAL

FIELD OF THE INVENTION

This invention relates to a method for forming a molded foam article and more particularly to a method for forming a skin layer during the molding of a foam layer of material on a heated mold surface by casting dry thermoplastic particles thereon.

BACKGROUND OF THE INVENTION

U.S. Pat. No. 4,769,278 discloses a method for forming a cast molded part incorporating an outer skin layer of thermoplastic material backed by a layer of foamed material formed by casting a resin powder with foam constituents against the inner surface of the outer skin layer.

U.S. Pat. No. 4,900,489 discloses a method for forming a skin foam article that includes preparing a preformed and fused skin from a resinous material and thereafter forming a second layer of expanded and fused layer of resinous material on the inner surface of the skin.

U.S. Pat. No. 3,555,130 disclose a molded article of microcellular urethane in which either a urethane quasi-prepolymer system or a one shot urethane system is directed into a mold surface to form an integral urethane skin that is substantially non-porous.

None of these patents discuss a method for casting a mixture of thermoplastic particles against the heated surface of a mold to simultaneously form an integral non-porous skin backed by a thin layer of foam suitable for use as a preformed cover for use in forming interior trim articles for automobiles and for use in other articles requiring a relatively non-porous good wearing outer surface combined with a soft feel.

SUMMARY OF THE INVENTION

An object of this invention is to provide a method for forming a thermoplastic material having a non-porous outer surface backed by a thin layer of soft foam material wherein the method includes the steps of providing a mixture of thermoplastic particles of differing molecular weight and with differing solvating properties and casting the mixture against a heated mold surface which is maintained at a temperature in the range of 90° C. to 218° C. The method includes selectively gelling the component parts of the mixture on the heated surface with a constituent having a greater molecular weight forming a layer of particles with interstices therein that are only partly gelled and melting the constituent with the lesser molecular weight to form a liquidous phase to flow into the interstices and to pool against the surface of the mold to form a dense non-porous outer skin and concurrently further heating the partly gelled particles to cause them to react with a foaming agent to form a closed cell foam backing layer for the non-porous outer skin.

A feature of the present invention is to provide a method as set forth in the preceding paragraph wherein the first and second constituents of the mixture are vinyl compounds formed of dry particles including a core of resin and plasticizer and wherein the resin is selected from the group including polyvinyl chloride, linear polyethylene, polypropylene, nylons, fluorocarbons, polyurethane prepolymers, polystyrene, cellulosic and acrylic resins and wherein the PVC resin having the lower molecular weight has a plasticizer selected to produce a sharp melting point temperature in the range of 182° C. to cause the lighter molecular weight particles to melt and form the liquidous phase which will flow through and pool against the heated mold surface to form a dense non-porous outer skin layer before the layer of particles forming the interstices melt and react with the foaming agent to form a backing layer of closed cell foam on the backside of the non-porous outer skin layer.

Yet another feature of the present invention is to provide a method for forming a thermoplastic part from a dry resin particle mixture including the steps of providing a mixture of first and second types of polyvinyl chloride resin particles with one of the types of resin particles having a lesser molecular weight than the other of the types of resins and wherein the lesser molecular weight resin particles have a plasticizer with a lower melting point that will cause the lesser molecular weight resin particles to melt before the particles of higher molecular weight to cause a pooling of the material from the lesser molecular weight particles and a flooding of interstices between the greater molecular weight particles to cause the first melting particles to collect at the surface of the heated mold to form a dense, non-porous skin and thereafter reacting the remaining particles with a foaming agent to form a closed cell foam backing layer on the backside of the skin.

Still another feature is to select the lower molecular weight material from thermoformable resins in the group including polyvinyl chloride, polyethylene having a molecular weight in the range of 60,000 to 180,000 M.W. and further including a high solvating plasticizer selected from the group including butyl benzyl phthalate (BBP). "High Solvating" is a generic term that describes the efficiency of the plasticizer's ability to penetrate and soften the thermoplastic polymer. An aggressive or high solvating type plasticizer will, in many cases, soften the polymer faster thus reducing process temperatures and expediting the transformation of the solid polymer into the plastic or melt phase. Butyl benzyl phthalate (BBP) is one of the most aggressive plasticizers for polyvinyl chloride (PVC) and still has a fair degree of compatibility with the PVC. BBP molecular weight is 312, other plasticizers that may be useful for this application are: alkyl benzyl phthalate, dibutyl phthalate, dialkyl adipate, dioctyl adipate, 2-ethylhexyl diphenyl phosphate, and diisodecyl phthalate.

Other objects, features and advantages of the present invention will become clearer from the following description made with reference to the examples and to the drawings appended hereto, in which:

EXAMPLES

Figure 1:
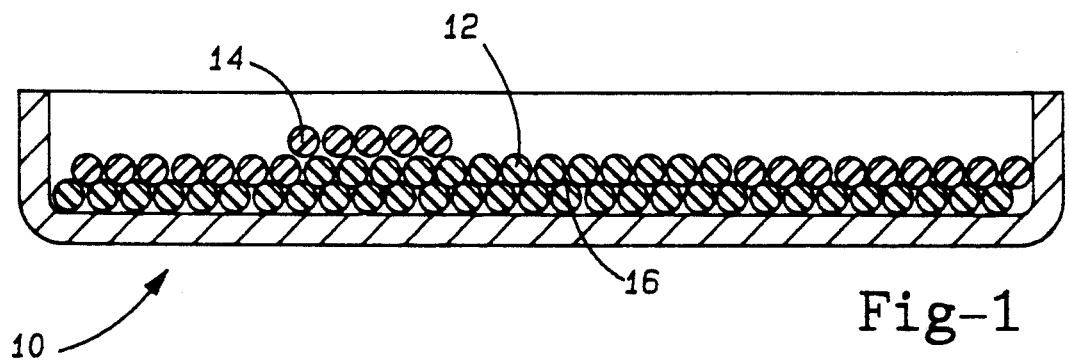
FIG. 1 is a diagrammatic view of a mixture of the particles of the present invention showing the respective particles before forming a liquidous phase from the lower molecular weight and high solvating plasticizer material.

1. A 75/25 ratio of two dry blended polyvinyl chloride compounds were blended together using a Henschel cooler Model No. FM-75.

The 75% portion of the mixture (DL-1011 vinyl foam) was a first dry powder compound including particles with a diameter in the range of from 75 to 525 microns and each of the particles comprising the following constituents:

Polyvinyl chloride (75% of blend) having a molecular weight of 117,000.

Foaming agent: Celogen $AZ_1$ (AZO) (trademark) manufactured by Uniroyal Chemical Corp.

Plasticizer: Jayflex 911 (trademark) manufactured by Exxon Corp.

Pigment—carbon black, manufactured by Microcolor Dispersions.

Accelerator—zinc is one of the active ingredients in the stabilizer package.

Stabilizer—Heavy metal complex manufactured by Ferro Corporation.

The zinc in this application also functions as an accelerator for the decomposition of the azo blowing agent. The blowing agent must decompose within the plastic or melt phase of shell processing to develop a cell structure in the molten vinyl. If the blowing agent decomposes before the melt phase, then the nitrogen gas (the by-product of the blowing agent during decomposition) is lost to the free atmosphere. If the blowing agent is activated too late in the melt phase, then large macro cell structures will be formed in the molten vinyl and not produce the desired durometer.

The 25% portion of the blend was a second dry powder compound including the following characteristics:

Geon-143 manufactured by B. F. Goodrich, comprising a polyvinyl chloride resin with a molecular weight of 96,000 and including a 57.5% by weight butyl benzyl phthalate (BBP) plasticizer sold by Monsanto under the trademark Santicizer 160. The combination of the lower molecular weight Geon 143 helped by the aggressive solvating power of the BBP lowers the melt point of this compound such that the melt flow temperature of the second compound is approximately 20 degrees lower than that of the 75% portion of the mixture.

The two portions of the blend are mixed together and are simultaneously cast as a blend against a mold surface of an electroformed nickel mold heated in the range of 194° C.

Flooding the partially melted particles of the 25% portion having the lower melting point particles forms a dense non-porous skin on the surface. The remaining lower melting point particles interact with those of the 75% portion to form a closed cell foam layer backing for the skin.

2. Other resins than the Geon 143 are available for this application. Any mass or suspension PVC resin having a M.W. range of 50,000 to 100,000 would be suitable in varying degrees for this application. Other manufacturers of the PVC would be Occidental Chemical Corp., Vista Chemical Co., Formosa Plastics Corp. and Georgia Gulf Corp. Other plasticizers than BBP available for the 25% portion include alkyl benzyl phthalate, dibutyl phthalate, dialkyl adipate, dioctyl adipate, 2-ethylhexyl diphenyl phosphate, and diisodecyl phthalate.

During experimentation, the entire range of blends in 10 part increments were as follows:

| Parts solid vinyl low M.W. resin w/BBP | Parts DL-1011 vinyl foam high M.W. resin |
| --- | --- |
| 100 | 0 |
| 90 | 10 |
| 80 | 20 |
| 70 | 30 |
| 60 | 40 |
| 50 | 50* |
| 40 | 60* |
| 30 | 70* |
| 20 | 80* |
| 10 | 90 |
| 0 | 100 |

The compound blends that form a desired non-porous skin and a closed cell foam backing layer are highlighted with an asterisk.

The examples are exemplary of suitable mixtures for producing the result of a single step casting dry particle process for simultaneously forming a high strength skin of high density PVC material backed by a soft foam layer.

While a 75/25 blend ratio of high to low molecular PVC compounds is preferred, it should be recognized that the blend ratio can be in the range of from 50-80% high molecular weight PVC compounds and 50-20% lower molecular weight (lower melt temperature) PVC compounds, with it being understood that greater percentages of the low molecular weight PVC compounds with higher solvating plasticizer will result in greater thickness skins and with lesser thicknesses of backing foam. Conversely, if greater percentages of the high molecular weight PVC compound are used, the thickness of the skin will be reduced and the thickness of the backing foam will increase.

Figure 4:
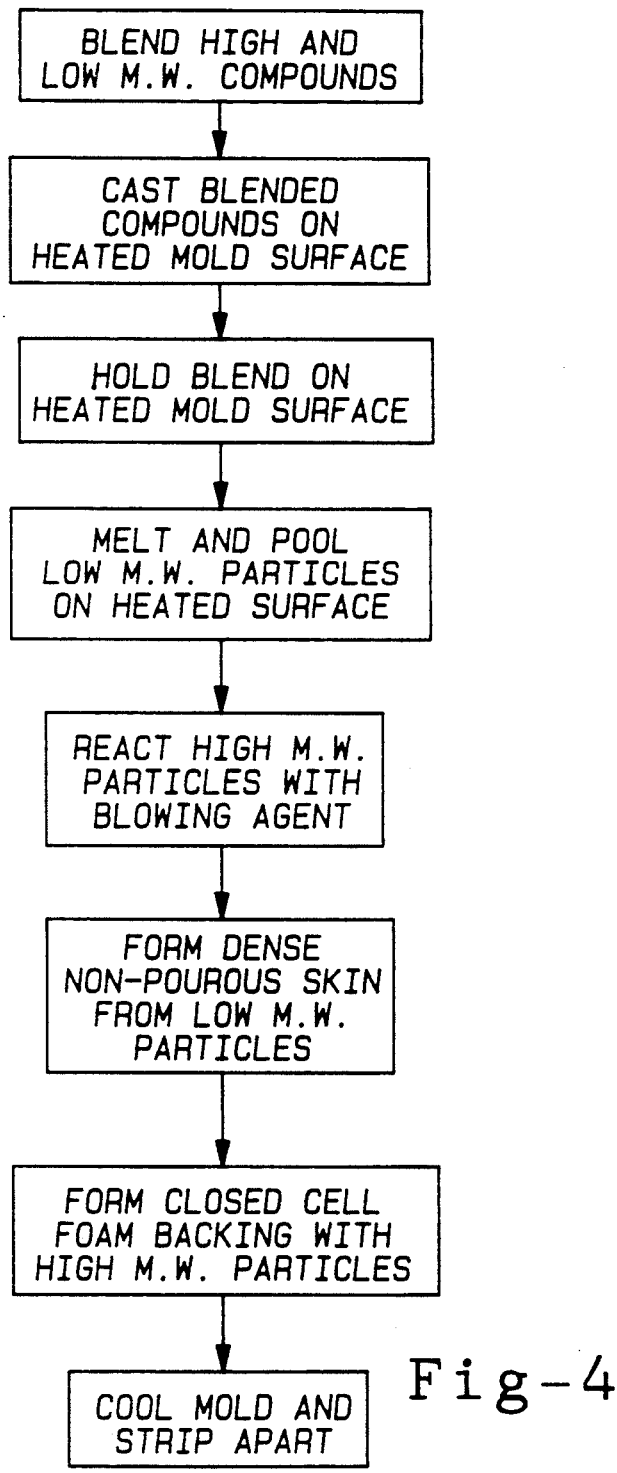
FIG. 4 is a flow chart of the method of the present invention.

FIG. 4 illustrates the above sequence of steps wherein a mold 10 formed of aluminum or electroformed nickel and heated to a desired temperature for melting and foaming the portions of the blend. The blend is mixed and simultaneously cast on the heated surface which has its temperature in the range of 90° C. to 218° C. and the blend is held on the surface for a period of about 5 minutes. During the first minute of the period, the low molecular weight particles melt to pool and flood the other particles to flow against the heated surface; during the remaining four minutes, the higher molecular weight material reacts with the foaming agent to form a closed cell foam backing layer. The mold is then cooled to room temperature and the two layer part is removed from the mold.

FIG. 1 is a diagrammatic representation of the mold 10 having a blend of low molecular weight particles 12 and high molecular weight particles 14. The particles 12, 14 have substantially the same diameter of from 76 to 525 microns such that initially the particles engage one another to form interstices 16 therebetween.

Figure 2:
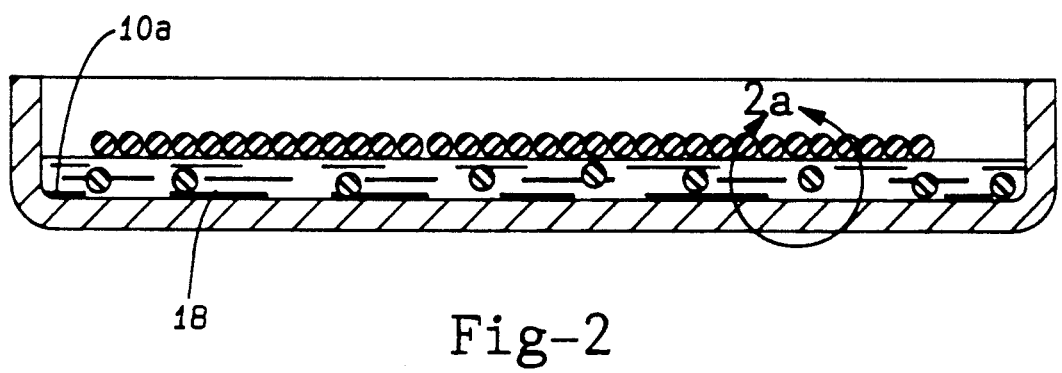
FIG. 2 is a diagrammatic view of a layer of the particles following formation of the inner non-porous skin.
Figure 2A:
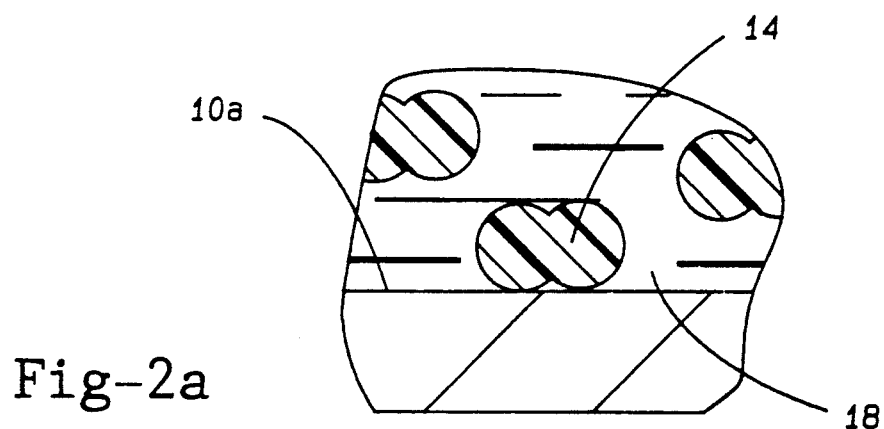
FIG. 2A is an enlarged diagrammatic view of region 2A in FIG. 2.

FIG. 2 shows the particles 12 in their liquidous phase in which they pool and flood the interstices to form a first layer 18 of the lower molecular weight material against the surface 10a of the mold.

Figure 3:
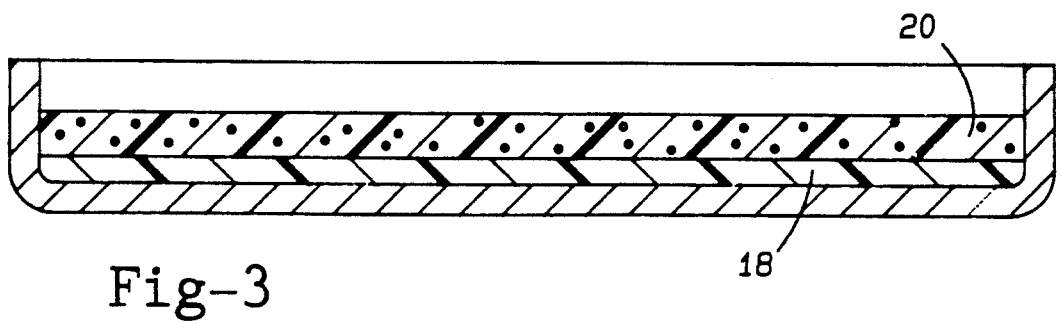
FIG. 3 is a diagrammatic view of the finished part.

FIG. 3 shows the particles 14 reacted with the foaming agent to form a closed cell foam layer 20 behind the first layer of greater density material.

TEST RESULTS

Heat cycle tests have been run on a part made by the method of the present invention with the following results.

The solid layer 18 retained its surface smoothness and the foam material did not infiltrate into the surface. The foam layer restored from a compressed thickness of 0.050" to a restored thickness of 0.100". The heat cycle consisted of a period of about 24 hours at a temperature of 101.6° C. followed by a period of about 24 hours at room temperature.

While the invention is shown for use with a flat face mold surface forming a laminated part having a nonporous outer layer and a closed cell inner layer of PVC foam material, it is suitable for use in the formation of other shapes corresponding to the shape of a final composite plastic product including various interior trim automobile products such as instrument panels, side door panels, armrests, consoles and including nonautomotive products such as suitcases, cases for electronic gear including PCs, furniture and similar kinds of products requiring an outer skin with a soft backing.

What is claimed is:

1. A method for forming a two layer plastic part comprising the steps of:
   providing a mixture having higher molecular weight thermoplastic particles and lower molecular weight thermoplastic particles with differing melting properties and blending the higher molecular weight thermoplastic particles with a blowing agent;
   casting the mixture against a heated mold surface which is maintained at a temperature in the range of 90° C. to 218° C. to form a layer of particles having interstices that comprises higher molecular weight thermoplastic particles; and
   melting lower molecular weight thermoplastic particles to form a liquidous phase and flowing the liquidous phase into the interstices so as to pool against the surface of the mold to form a solid outer skin and concurrently heating higher molecular weight thermoplastic particles to cause them to mix with a foaming agent to form a closed cell foam backing layer for the solid outer skin,
   wherein the particles of the mixture are provided as vinyl compounds formed of dry particles including a core of resin and plasticizer and wherein the resin is selected from the group consisting of polyvinyl chloride, linear polyethylene, polypropylene, nylons, fluorocarbons, polyurethane prepolymers, polystyrene, cellulosic and acrylic resins, and wherein the vinyl compounds for the lower molecular weight thermoplastic particles have a plasticizer selected to produce a melting point temperature to cause the lower molecular weight thermoplastic particles to melt to form a liquidous phase that flows through the interstices and pools against the heated mold surface to form a dense solid outer skin layer before the layer of particles forming the interstices melt and blend with the foaming agent to form a backing layer of closed cell foam on the backside of the solid outer skin layer.

2. A method for forming a two layer plastic part comprising the steps of:
   providing a mixture having higher molecular weight thermoplastic particles and lower molecular weight thermoplastic particles with differing melting properties and blending the higher molecular weight thermoplastic particles with a blowing agent;
   casting the mixture against a heated mold surface which is maintained at a temperature in the range of 90° C. to 218° C. to form a layer of particles having interstices that comprises higher weight thermoplastic particles; and
   melting lower molecular weight thermoplastic particles to form a liquidous phase and flowing the liquidous phase into the interstices so as to pool against the surface of the mold to form a solid outer skin and concurrently heating higher molecular weight thermoplastic particles to cause them to mix with a foaming agent to form a closed cell foam backing layer for the solid outer skin,
   wherein the particles of the mixture are provided by first and second types of polyvinyl chloride resin particles with one of the types of resin particles having a lower molecular weight and the other type of resin particles having a higher molecular weight and wherein the lower molecular weight resin particles have a plasticizer with a melting point that will cause the lower molecular weight resin particles to melt at a lower temperature than the higher molecular weight resin particles melt thereby to cause a pooling of the material from the lower molecular weight particles and a flooding of the interstices between the higher molecular weight particles to cause lower molecular weight particles to collect at the surface of the heated mold to form a solid skin and thereafter reacting remaining particles with a foaming agent to form a closed cell foam backing layer on the backside of the skin.

3. A method for forming a two layer plastic part comprising the steps of:
   providing a mixture having higher molecular weight thermoplastic particles and lower molecular weight thermoplastic particles and with differing melting properties and blending the higher molecular weight thermoplastic particles with a blowing agent;
   the lower molecular weight particles being selected from thermoformable resins in the group consisting of polyvinyl chloride, linear polyethylene, polypropylene, nylons, fluorocarbons, polyurethane prepolymers, polystyrene, cellulosic and acrylic resins, and further including a high solvating plasticizer selected from the group consisting of butyl benzyl phthalate, alkyl benzyl phthalate, dibutyl phthalate, dialkyl adipate, dioctyl adipate, 2-ethylhexyl diphenyl phosphate, and diisodecyl phthalate to expedite the transformation of the lower molecular weight particles into a plastic melt phase;
   casting the mixture against a heated mold surface which is maintained at a temperature in the range of 90° C. to 218° C. to form a layer of particles having interstices comprising the higher molecular weight thermoplastic particles; and
   melting the lower molecular weight particles to form a liquidous phase and flowing the liquidous phase into the interstices so as to pool against the surface of the mold to form a solid outer skin and concurrently heating the higher molecular weight particles to cause them to mix with a foaming agent to form a closed cell foam backing layer for the solid outer skin.

* * * * *